(12) United States Patent
Claussen et al.

(10) Patent No.: US 7,152,720 B2
(45) Date of Patent: Dec. 26, 2006

(54) AUTOMATED INTER-AXLE DIFFERENTIAL LOCK ACTUATION SENSING METHOD

(75) Inventors: Stephen P. Claussen, Richland, MI (US); James A. Beverly, Kalamazoo, MI (US); Leo J. Wenstrup, Portage, MI (US)

(73) Assignee: Dana Corporation, Toledo, OH (US)

( * ) Notice: Subject to any disclaimer, the term of this patent is extended or adjusted under 35 U.S.C. 154(b) by 175 days.

(21) Appl. No.: 11/031,809

(22) Filed: Jan. 8, 2005

(65) Prior Publication Data
US 2006/0154787 A1  Jul. 13, 2006

(51) Int. Cl.
*B60K 17/36* (2006.01)
*F16D 11/14* (2006.01)

(52) U.S. Cl. .............. 192/30 W; 192/69.82; 475/220; 180/24.09

(58) Field of Classification Search ............. None
See application file for complete search history.

(56) References Cited

U.S. PATENT DOCUMENTS

| | | | |
|---|---|---|---|
| 2,603,108 A | 7/1952 | Carlson | |
| 4,050,534 A * | 9/1977 | Nelson et al. | 180/24.09 |
| 4,462,271 A * | 7/1984 | Stieg | 475/86 |
| 4,671,373 A | 6/1987 | Sigl | |
| 4,937,750 A | 6/1990 | Gilliam | |
| 5,071,392 A | 12/1991 | Stall et al. | |
| 5,130,928 A | 7/1992 | Petersen | |
| 5,247,443 A | 9/1993 | Gilliam | |
| 5,301,769 A | 4/1994 | Weiss | |
| 5,545,103 A | 8/1996 | Gustin | |
| 5,676,219 A | 10/1997 | Fruhwirth et al. | |
| 5,860,889 A * | 1/1999 | Schlosser et al. | 475/221 |
| 5,927,422 A | 7/1999 | Schakel | |
| 5,989,147 A | 11/1999 | Forrest et al. | |
| 6,174,255 B1 | 1/2001 | Porter et al. | |
| 6,241,067 B1 * | 6/2001 | Hock | 192/85 A |
| 6,336,069 B1 | 1/2002 | Hasegawa et al. | |
| 6,487,486 B1 | 11/2002 | Anderson | |
| 6,524,207 B1 | 2/2003 | Murakami et al. | |
| 6,579,204 B1 | 6/2003 | Brown et al. | |
| 6,776,275 B1 | 8/2004 | Gratzer | |
| 6,913,129 B1 * | 7/2005 | Ezure et al. | 192/30 W |

* cited by examiner

*Primary Examiner*—Richard M. Lorence
*Assistant Examiner*—Edwin A. Young
(74) *Attorney, Agent, or Firm*—Marshall & Melhorn, LLC (57) ABSTRACT

The present invention relates to an automatic inter-axle differential lock actuation sensing method for a vehicle having a tandem drive axle. The inter-axle differential lock actuation sensing method comprises providing a clutch locking mechanism of an inter-axle differential for a vehicle, the clutch locking mechanism having a first set of teeth in a fixed position and a second set of teeth on a sliding clutch, locating a speed sensor such that when the clutch mechanism is disengaged the sensor measures a speed of the sliding clutch, and when the clutch mechanism is fully engaged the sensor measures zero speed even though the sliding clutch continues to rotate, providing a speed of the vehicle from a vehicle data link, and using the speed sensor-speed and the vehicle speed to determine status of clutch mechanism engagement.

4 Claims, 9 Drawing Sheets

AUTOMATED INTER-AXLE DIFFERENTIAL LOCK ACTUATION SENSING METHOD

BACKGROUND OF THE INVENTION

The present invention generally relates to an inter-axle differential lock actuation sensing method and, more particularly, to an inter-axle differential lock actuation sensing method for a vehicle having a tandem drive axle assembly.

Tandem drive axle assemblies having a forward rear axle and a rearward rear axle in proximity with each other are well known. Such tandem drive assemblies are widely used on heavy duty trucks and other over-the-road vehicles, such as busses, which have a high vehicle weight and/or a high load carrying capacity. In such assemblies, both rear axles may be power driven.

An inter-axle differential (IAD) is commonly employed in such vehicles to split the input shaft torque between the front and rear axle of the tandem. It is common for a vehicle operator to engage and disengage a lock out that overrides or disables the IAD through the use of a pneumatic switch, which typically is mounted on the vehicle dash. The pneumatic switch, in turn, applies air to an axle mounted actuator, which engages a sliding dog clutch to "lock" the inter-axle differential.

However, there are several shortcomings to the above-described manual methods of engaging/disengaging the IAD. First, failure of the vehicle operator to notice wheel end slip occurring and engage the IAD, can result in spin out failures. Second, engagement of the IAD, while significant slipping is in process, can result in damage to the-drive axle. Third, leaving the IAD engaged for an extended length of time can result in "drive line wind-up" and a resulting inability to disengage the IAD without reversing the vehicle. As a result of these shortcomings, extended wear can occur and the operator may not notice the wear, as actual engagement and disengagement of the IAD is not typically indicated.

More recently, automatic inter-axle differential lockout mechanisms have come into use, where speed sensors have been employed to monitor wheel end speed. For example, U.S. Pat. No. 4,050,534 to Nelson et al. generally discloses means for sensing a difference in the rotational speeds of first and second rear drive axles, and means for actuating a lockup means in response to the rotational speed difference for a tandem axle drive.

U.S. Pat. No. 5,676,219 to Fruhwirth et al. teaches a system for controlling the axle differential locks for automotive vehicles. The axle differential locks appear to be controlled by wheel speed sensors that estimate inter-axle and cross axle slippage by comparing the rotational speeds of the wheels.

U.S. Pat. No. 5,927,422 to Schakel provides a method and apparatus for correcting drive wheel slip while utilizing wheel speed sensors to determine rotational speeds of the driveshaft and non-driven wheel. A central processor appears to compare the ratios of driveshaft speed to the non-driven wheel speed for locking various interaxle differentials.

U.S. Pat. No. 6,174,255 to Porter et al. discloses a differential lock control system that employs speed sensors and an articulation angle sensor that communicate speed signals and an articulation angle signal to a microprocessor for controlling the locks on front and rear differentials for an articulated work vehicle. It appears that in an automatic mode, the microprocessor controls the locking of the differentials by comparing predicted axle speeds to actual speeds received from the speed sensors and an articulation angle from the articulation sensor.

U.S. Pat. No. 6,336,069 to Hasegawa et al. teaches a front and rear wheel load distribution control system for an inter-axle differential. Means for measuring and eliminating rotational differentials between the axles that are used for operating an inter-axle differential lock are also taught. This appears to be achieved through the use of a crossing angle detection sensor in conjunction with front and rear axle rotations sensors.

U.S. Pat. No. 6,524,207 to Murakami et al. discloses a control method for an inter-axle differential system and at least three rotational frequency detectors are used to detect skidding and the like. A controller appears to detect at least any one of the three rotational frequencies and a rate of change with time of that particular detected rotational frequency and then the controller outputs a locking signal to an inter-axel differential lock.

However, even with current sensing means for controlling the engaging and disengaging of the inter-axle differential, improvements in the sensing means may still be sought, for example, providing fewer sensors, more accuracy, and less weight to the sensing required for inter-axle differential lock actuation.

SUMMARY OF THE INVENTION

The present invention relates to an automatic inter-axle differential lock actuation sensing method for a vehicle having a tandem drive axle. The inter-axle differential lock actuation sensing method comprises providing a clutch locking mechanism of an inter-axle differential for a vehicle, the clutch locking mechanism having a first set of teeth in a fixed position and a second set of teeth on a sliding clutch, locating a speed sensor such that when the clutch mechanism is disengaged the sensor measures a speed of the sliding clutch, and when the clutch mechanism is fully engaged the sensor measures zero speed even though the sliding clutch continues to rotate, providing a speed of the vehicle from a vehicle data link, and using the speed sensor speed and the vehicle speed to determine status of clutch mechanism engagement.

Further advantages of the present invention will be apparent from the following description and appended claims, reference being made to the accompanying drawings forming a part of a specification, wherein like reference characters designate corresponding parts of several views.

DETAILED DESCRIPTION OF THE PREFERRED EMBODIMENTS

Figure 1:
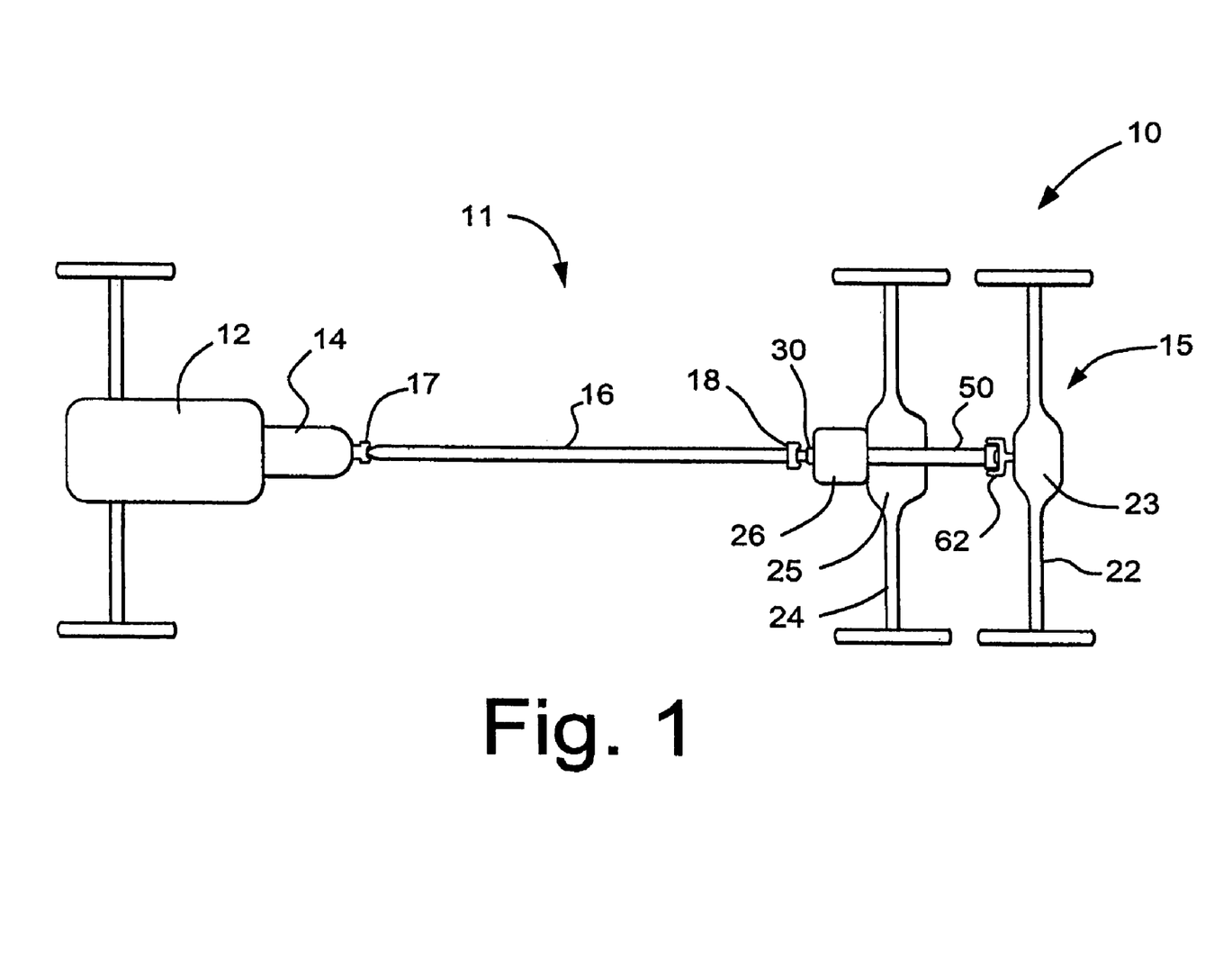
FIG. 1 is a mechanical schematic of a top-plan view of a vehicle in accordance with the present invention.

In general, the present invention involves the use of an automatic inter-axle differential (IAD) locking system 10 for a vehicle 11 having a tandem drive axle assembly 15, as generally illustrated in FIG. 1. The vehicle 11 has an engine 12, which is drivingly connected to a transmission 14. A main drive shaft 16 extends longitudinally from the transmission 14 to the tandem axle assembly 15, and may be coupled at one end via a conventional coupling 17, such as a yoke or a universal joint, to the transmission 14, and at the other end by another conventional coupling 18 to an input shaft 30 of the tandem drive axle assembly 15.

Vehicle 11 may be any vehicle having a tandem axle assembly, such as a truck, bus or other over-the-road vehicle which has a tandem axle assembly comprising two axially spaced axles. The tandem axle assembly 15 is usually located near the rear of a vehicle and may, therefore, be referred to herein as a tandem rear axle assembly. The tandem rear axle assembly 15 comprises a rearward rear axle 22, which in turn comprises axially aligned right and left axle shafts which are driven through an axle differential 23. In addition, a forward rear axle 24 also comprises axially aligned right and left axle shafts which are driven through an axle differential 25. The axles 22 and 24 of the tandem rear axle assembly 15 herein are axially spaced apart but are in proximity with each other toward one end of the vehicle 11.

All parts of both the vehicle 11 as a whole and the tandem rear axle assembly 15 described so far may be conventional. Thus, the two axle differentials 23 and 25 (which are to be distinguished from an inter-axle differential to be subsequently described) may be conventional.

Figure 2:
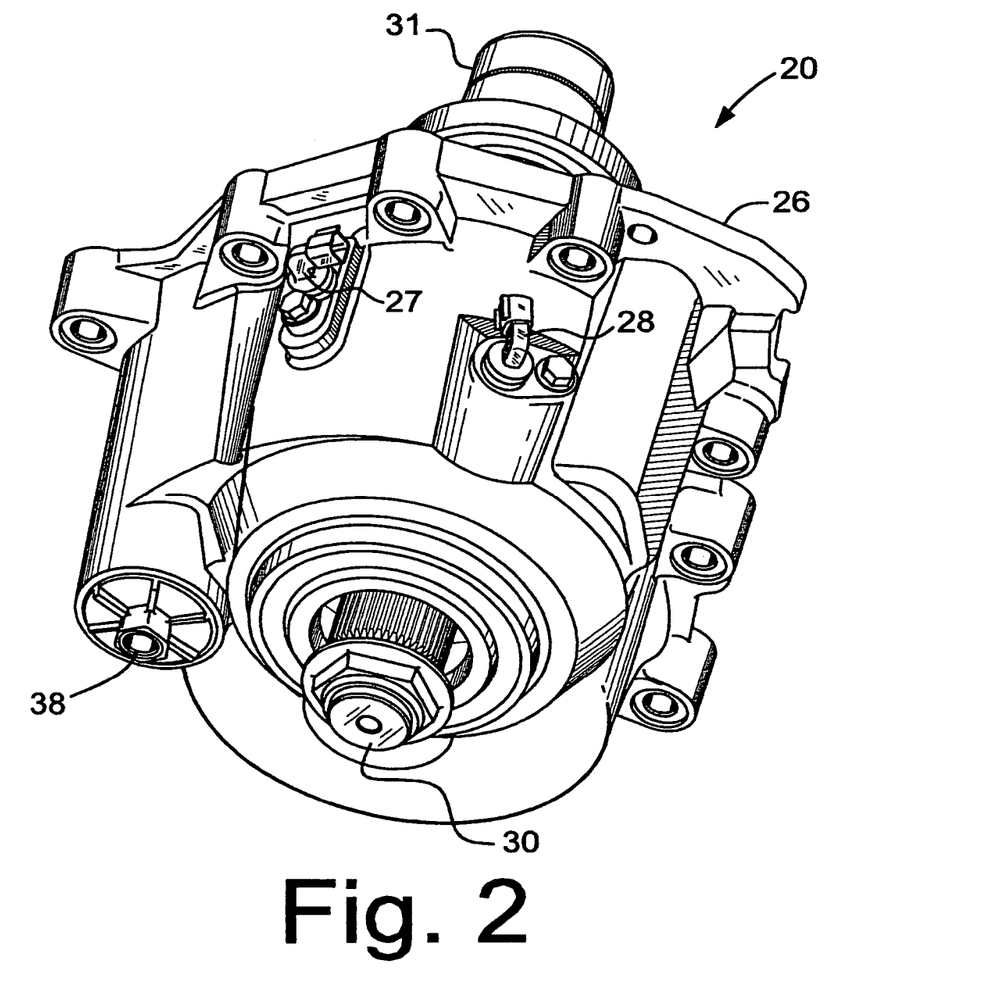
FIG. 2 is a three dimensional view of the inter-axle differential in accordance with the present invention.

Turning to FIG. 2, a tandem inter-axle assembly 20 of the preferred embodiment has a housing 26 at its forward end to rotatably support a longitudinally extending input shaft 30, which may be axially aligned with the vehicle drive shaft 16. The forward end of input shaft 30 is coupled to vehicle drive shaft 16 in direct drive relationship by means of the coupling 18. The input shaft 30 is received in the inter-axle differential 20 for transmitting input torque from the vehicle drive shaft to the inter-axle differential 20. Also shown in FIG. 2 are an inter-axle output shaft 31 that consequently transmits torque to the rearward rear axle 22 (via an output drive shaft 50 and a rearward coupling 62, as shown in FIG. 1), a rotating side helical gear speed-sensor 27, and a rotating sliding clutch lock speed sensor 28. The sensors 27, 28 may be conventionally available sensors.

Figure 3:
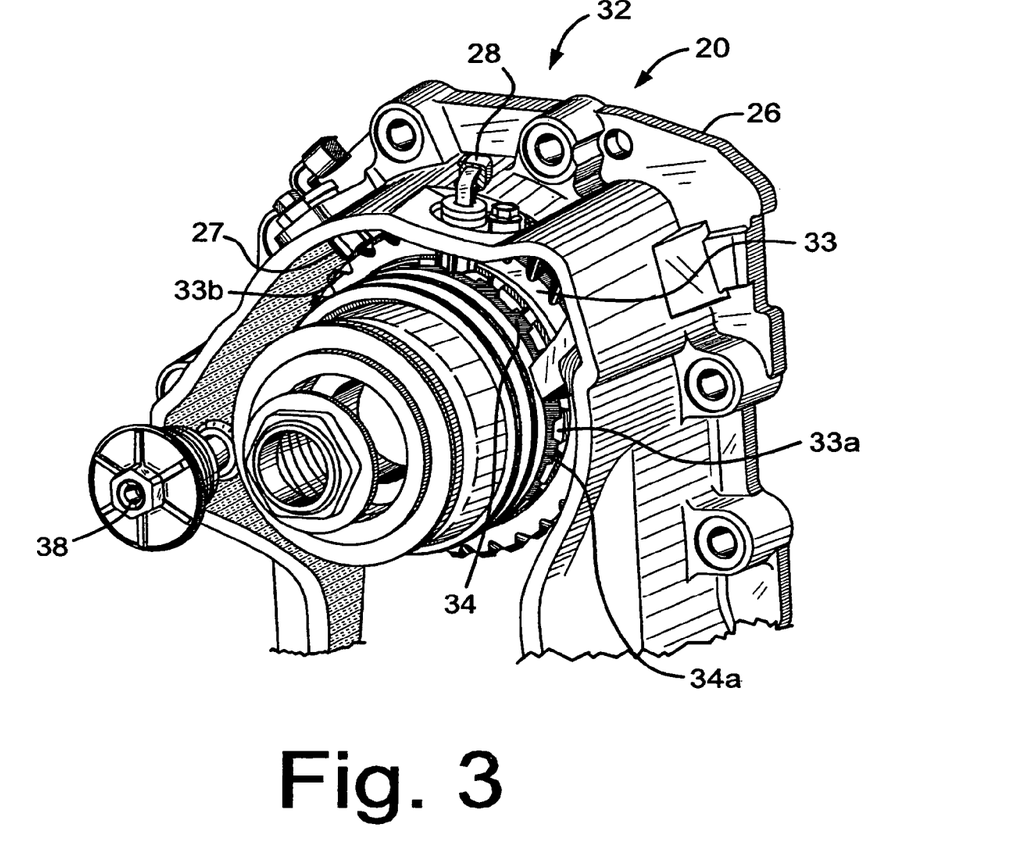
FIG. 3 is a partial cut-away of the three dimensional view of the inter-axle differential of FIG. 2.

As illustrated in FIG. 3, the vehicle IAD 20 further comprises a clutch locking mechanism 32 that includes a rotating side helical gear 33 and a rotating sliding clutch 34. As shown in FIG. 3, the sliding clutch lock mechanism 32 is engaged and subsequently locked, where locked is defined as helical gear teeth 33a and sliding clutch teeth 34a being in a meshing relationship. Note that the helical gear teeth 33a are in a fixed position.

Figure 4:
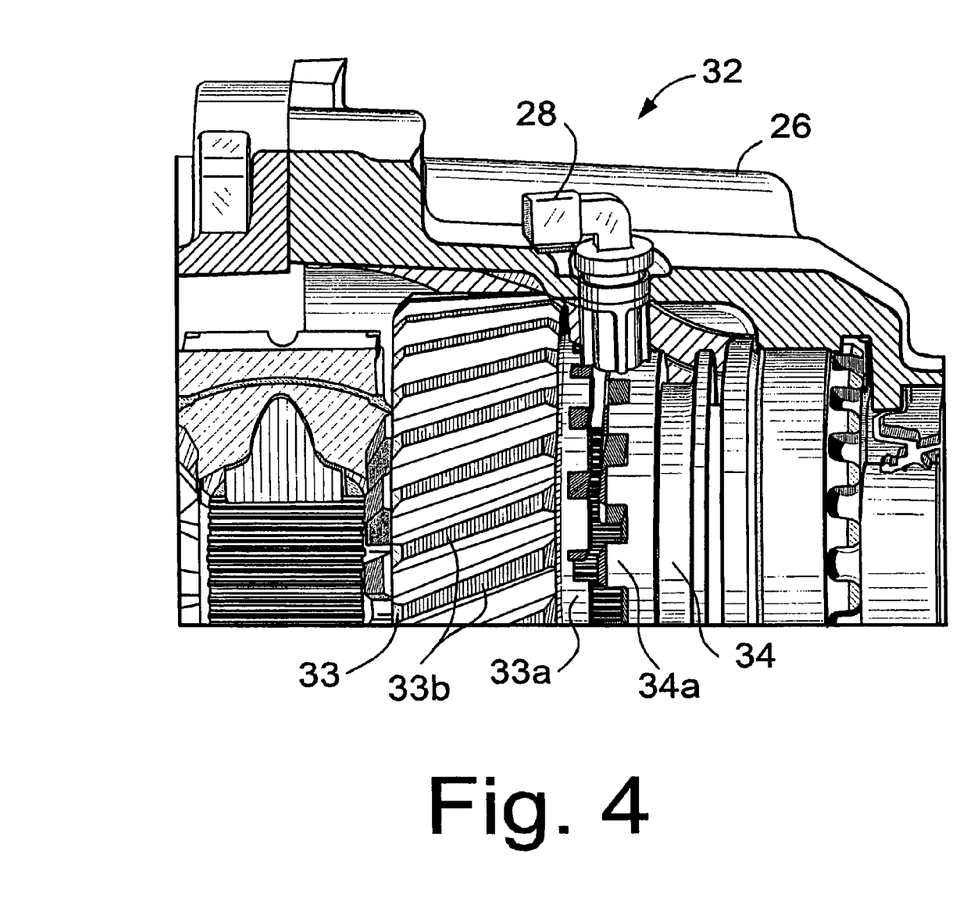
FIG. 4 is a partial cut-away of a three dimensional side view of the inter-axle differential of FIG. 2.

On the other hand, FIG. 4, which is a partial cut-away side view of the cover 26 of the inter-axle differential 20 of FIG. 2, taken near to the sliding clutch sensor 28, illustrates the sliding clutch lock mechanism 32 being disengaged (a.k.a., unlocked), where the helical gear teeth 33a of the rotating side helical gear 33 and the teeth 34a of the sliding clutch 34 are separated.

Also illustrated in FIG. 4 is the alignment of the sliding clutch speed sensor 28 over the teeth 34a of the sliding clutch 34. When the sliding clutch lock mechanism 32 is disengaged, the sliding clutch speed sensor 28 measures the a speed of the sliding clutch 34 by sensing a presence and then an absence of the rotating teeth 34a of the clutch 34 passing below the sliding clutch speed sensor 28. Thus, the sliding clutch speed sensor 28 provides a sliding clutch signal to a microprocessor 35 (see FIG. 7, for example, MC9S12D64) for determining the speed of the sliding clutch 34, when the gear 33 and the clutch 34 are disengaged. However, when the clutch mechanism 32 is fully engaged (as in FIG. 3) the sensor 28 measures zero sliding clutch speed even though the sliding clutch 34 continues to rotate.

Figure 7:
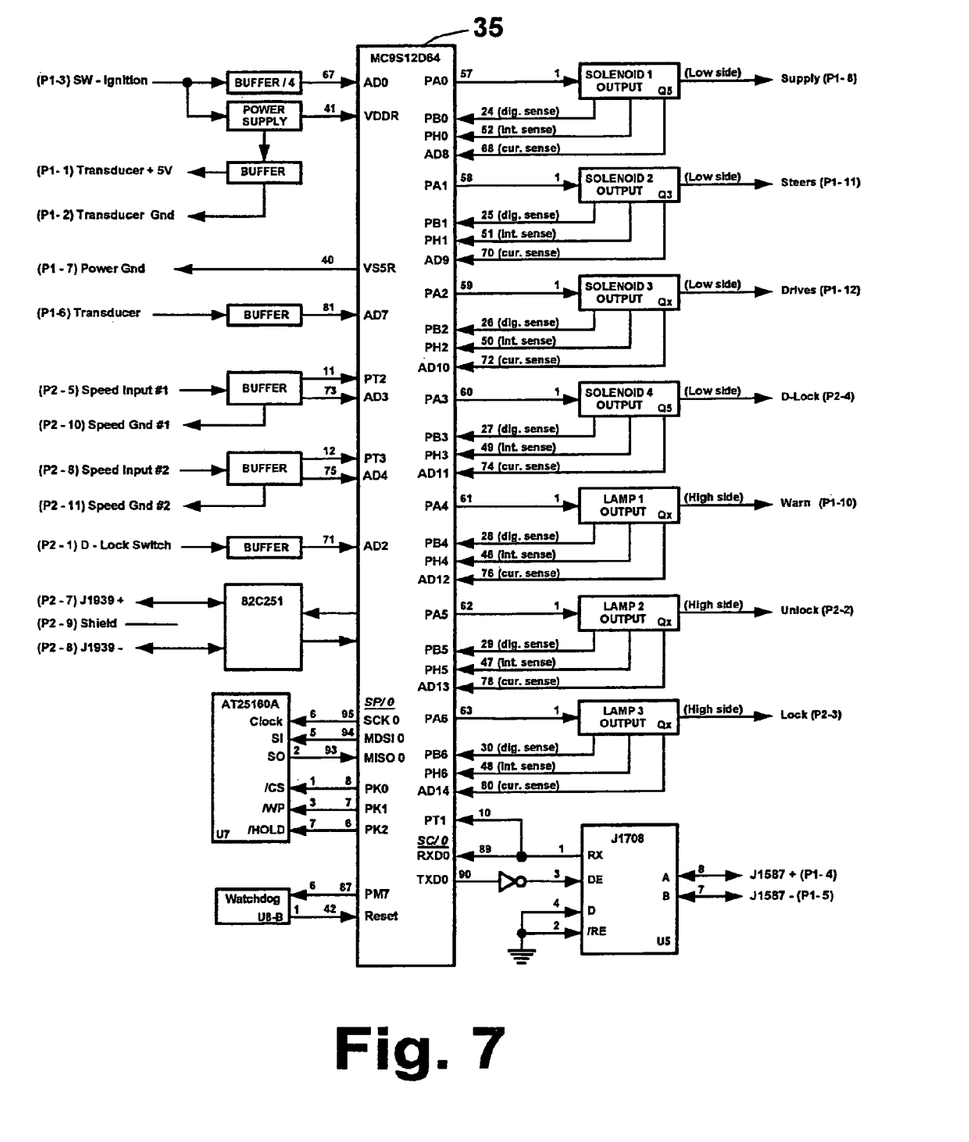
FIG. 7 is an electrical schematic of a microprocessor accordance with the present invention.

The helical gear speed sensor 27, shown in FIG. 3, determines the speed of the helical gear 33 by sensing the presence and absence of second helical gear teeth 33b, which provides a helical gear signal to the microprocessor 35 (see FIG. 7).

When the gear 33 and the clutch 34 are locked, the sliding clutch speed sensor 28 no longer senses the presence and then the absence of the teeth 34a. It is a discovery of the instant invention that when the clutch mechanism 32 is locked, the sliding clutch speed sensor 28 does not provide a signal to the microprocessor 35, even though the sliding clutch 34 continues to rotate, which is due to the specific placement of the clutch sensor 28. The absence of a signal is determined by the microprocessor 35 to mean that the clutch mechanism 32 is locked. Thus, the microprocessor 35 is informed of the locked or unlocked state of the clutch mechanism 32, without requiring a separate sensor in addition to the two speed sensors 27, 28.

Figure 5:
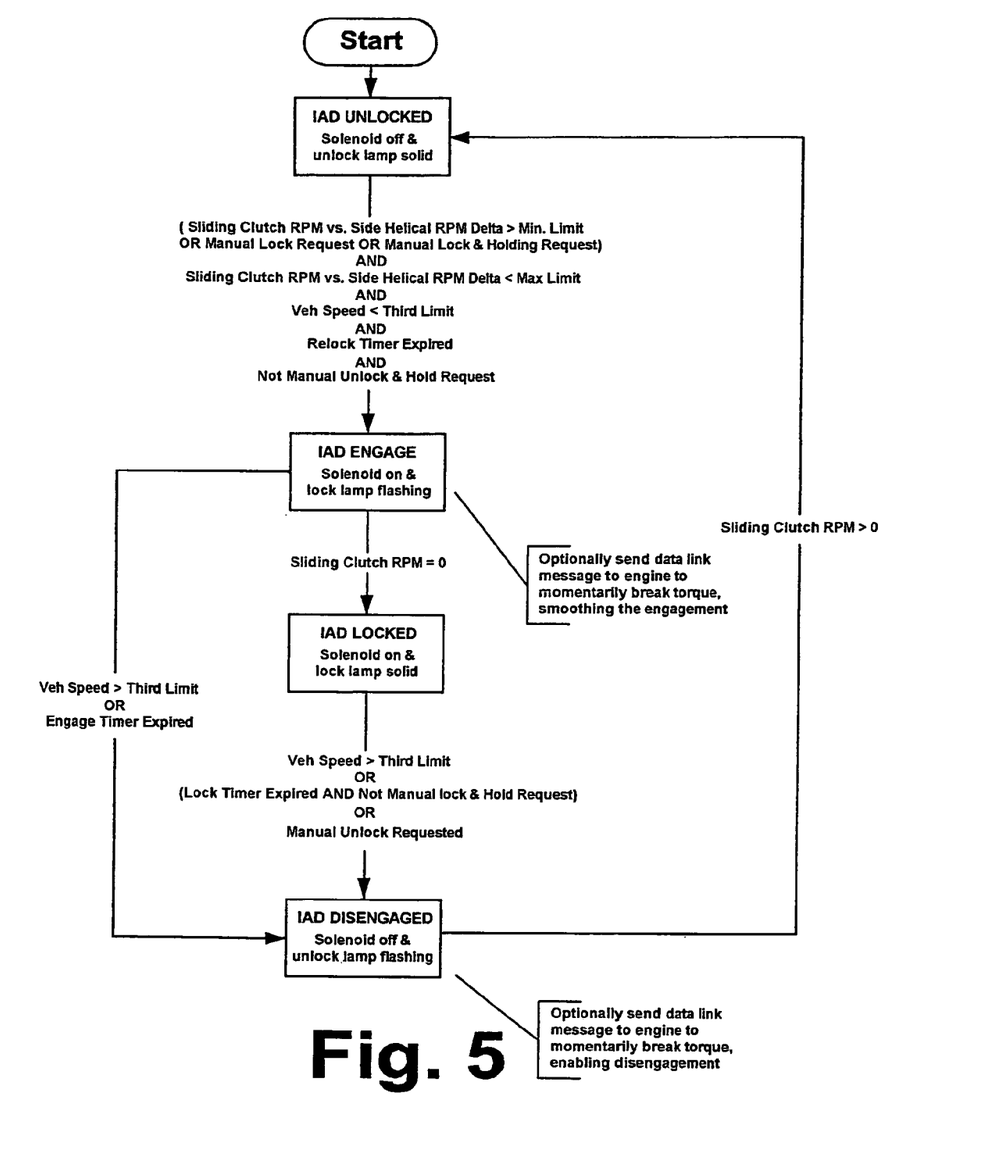
FIG. 5 is a flow chart of the logic in accordance with the present invention.

Referring to FIG. 5, there is shown a flow chart of logic in accordance with the present invention. Upon start up of the automatic IAD lock system 10, an engaged solenoid 37 (see FIG. 6 for inputs and outputs associated with the solenoid 35 and various lamps and LEDs) is turned off and an "unlock lamp" is turned on solid in the vehicle compartment to indicate to the operator of the vehicle 11 that the clutch mechanism 32 is unlocked.

Figure 6:
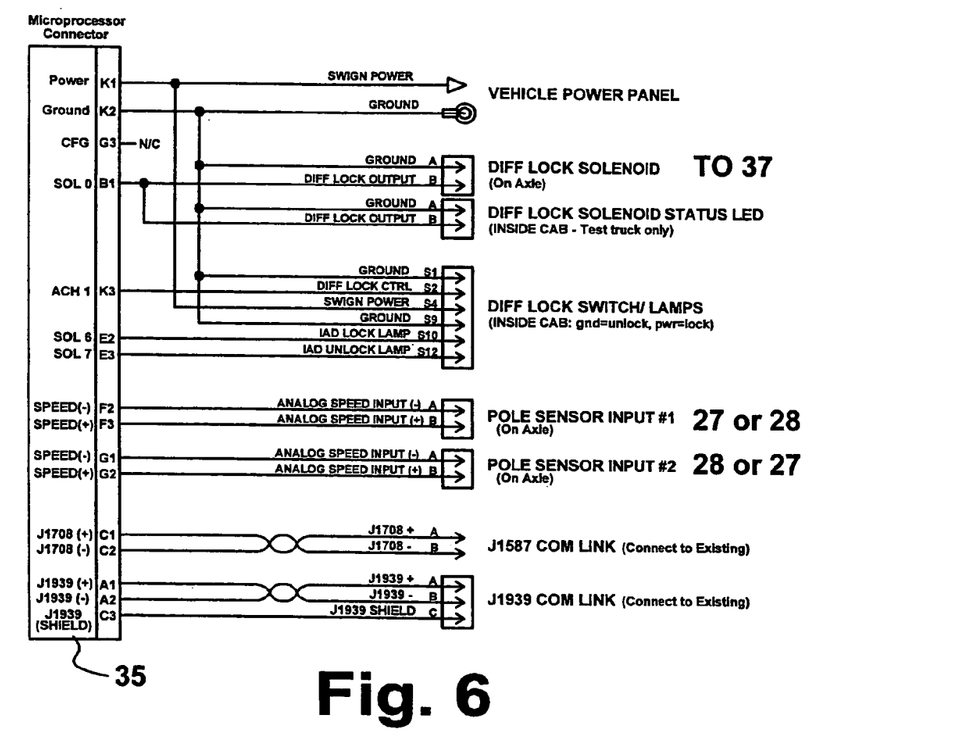
FIG. 6 is an electrical connector diagram in accordance with the present invention.

The system 10, through the aid of the microprocessor 35, then determines if the mathematical absolute difference between the sliding clutch 34 revolutions per minute and the side helical gear revolutions per minute is greater than a minimum limit, and if the mathematical absolute difference between the sliding clutch revolutions per minute and the side helical gear revolutions per minute is less than a maximum limit, and the speed of the vehicle, which is obtained from the vehicle communication data link (for example, comm. link J1587 or comm. link 1939 as illustrated in FIGS. 6–7) of the electronic controls in engine 12, is less than a third limit, and a relock timer has expired, and no manual unlock and hold has been requested. If all of these conditions are met, then the system 10 causes the inter-axle differential clutch mechanism 32 to commence engagement by turning on the engage solenoid 37, by turning on an engage timer, and causes a "lock" lamp to flash on and off.

While in the IAD engage mode, the system 10 monitors the vehicle speed so as to determine if the vehicle speed is greater than the third limit. If the vehicle speed is greater than the third limit or if the engage timer has expired, then the system disengages the IAD 20, which includes turning off the engage solenoid 37, and causes the unlock lamp to flash on and off.

Note that the engage solenoid 37 may be located anywhere in/on the vehicle where it will not be damaged. The solenoid 37 controls pressurized air flow through the port 38

Figure 8:
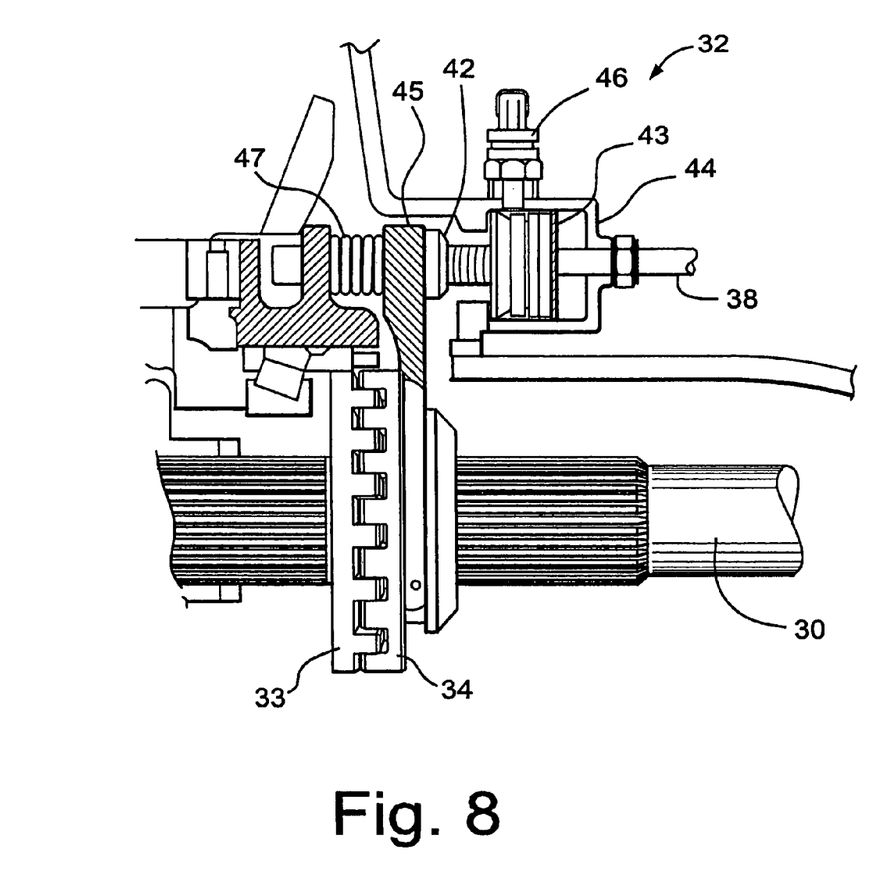
FIG. 8 is a side view of an engaged inter-axle differential in accordance with the present invention.
Figure 9:
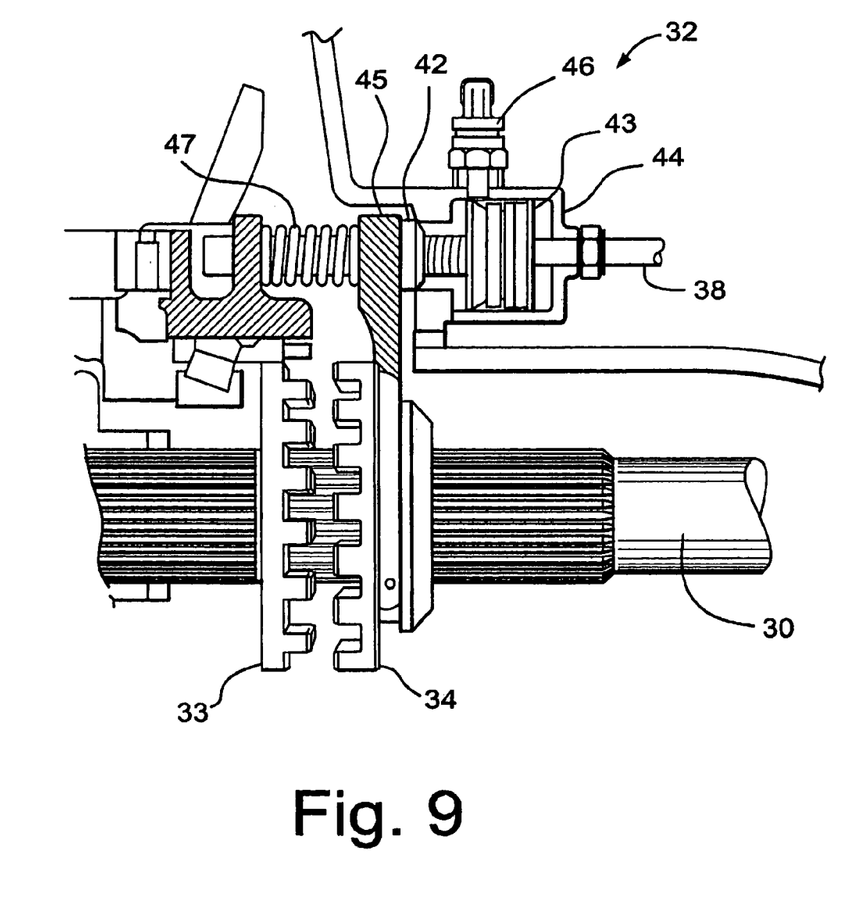
FIG. 9 is a side view of a disengaged inter-axle differential in accordance with the present invention.

(see FIGS. 2 and 3). As shown in FIGS. 8 and 9 the air causes the inter-axle differential clutch mechanism 32, which may also include various other elements (push rod 42, piston 43, shift cylinder 44, shift fork 45, selector switch 46 (used in a manual control versus the microprocessor 35 control of the present invention), and spring 47) to engage (FIG. 8) or disengage (FIG. 9). As FIGS. 8–9 conventionally illustrate, the air flow is controlled by the selector switch 46, but in the present invention a separate solenoid 37 may be utilized to allow pressurized air to enter or not to enter port 38, which subsequently causes the fork 45 to shift the sliding clutch 34.

A further discovery of the present invention is that, optionally, when the IAD 20 is in the process of engaging, as discussed above, the system 10 may communicate a vehicle communication data link message (comm. link J1939 or the like) to the electronic controls in the engine 12 to momentarily break engine torque. This discovery has been found to smooth the engagement of the IAD 20.

When the system 10 determines that the sliding clutch RPM is approximately equal to zero, which is determined by way of the sliding clutch speed sensor 28, the IAD 20 is locked with the engage solenoid 37 being on (i.e., locking), and the system 10 then causes the lock lamp to be solidly lit. The system 10 remains in the IAD locked position until any one of the following conditions are communicated to the system 10 a) the vehicle speed is greater than the third limit, b) the lock timer has expired in conjunction with the manual lock and hold request not being requested by the operator, or c) the manual unlock request has not been made by the operator. If, however, any one of these conditions are communicated to the system 10, then the system 10 proceeds to disengage the IAD 20 by turning off (i.e., unlocking) the engage solenoid 37, and causes the unlock lamp to flash on and off.

Another discovery of the present invention is that, optionally, when the IAD 20 is in this process of disengaging, the system 10 may communicate a vehicle communication data link message to the electronic controls in the engine 12 to momentarily break engine torque. This discovery has been found to smooth the disengagement of the IAD 20.

While in the IAD disengage mode, the system 10 monitors the sliding clutch RPM so as to determine if the sliding clutch 34 is greater than zero (i.e., the teeth 33a, 34a are no longer meshed). If the sliding clutch RPM is greater than zero, then the system 10 returns the IAD 20 to the unlocked mode, as discussed above, where the engage solenoid 37 remains off and the "unlock lamp" is turned on solid in the vehicle compartment to indicate to the operator of the vehicle 11 that the clutch mechanism 32 is unlocked.

FIG. 6 illustrates the microprocessor 35 connections to inputs and outputs (for example, 27, 28, 37, and various conventional lamps/LEDs) for the system 10. It may be appreciated that the system 10 is not limited by the lamps, LEDs, solenoids, the pneumatic means to cause air to flow to the shift fork 45 that causes engagement and disengagement of the locking mechanism 32).

In accordance with the provisions of the patent statutes, the principles and modes of operation of this invention have been described and illustrated in its preferred embodiments. However, it must be understood that the invention may be practiced otherwise than specifically explained and illustrated without departing from its spirit or scope.

What is claimed is:

1. An inter-axle differential lock actuation sensing method for a vehicle having a tandem drive axle, comprising:
   providing a clutch locking mechanism of an inter-axle differential for a vehicle, said clutch locking mechanism having a first set of teeth in a fixed position and a second set of teeth on a sliding clutch;
   locating a speed sensor such that when said clutch mechanism is disengaged the sensor measures a speed of said sliding clutch, and when said clutch mechanism is fully engaged the sensor measures zero speed even though said sliding clutch continues to rotate;
   providing a speed of said vehicle from a vehicle data link; and
   using said speed sensor speed and said vehicle speed to determine status of clutch engagement.

2. The inter-axle differential lock actuation sensing method of claim 1, wherein said first set of teeth are on a helical gear.

3. The inter-axle differential lock actuation sensing method of claim 1, wherein said speed sensor is positioned above said second set of teeth, when said clutch mechanism is disengaged.

4. An inter-axle differential lock actuation sensing method comprising:
   providing a clutch locking mechanism of an inter-axle differential for a vehicle, said clutch locking mechanism having a helical gear with a set of teeth in a fixed position and a sliding clutch with a set of teeth;
   locating a speed sensor such that when said clutch mechanism is disengaged the sensor measures a speed of said sliding clutch, and when said clutch mechanism is fully engaged the sensor measures zero speed even though said sliding clutch continues to rotate;
   providing a speed of said vehicle; and
   using a microcomputer in measuring the speed from said speed sensor and said vehicle speed from a vehicle data link to determine status of clutch engagement;
   wherein said speed sensor is positioned above said sliding clutch teeth, when said clutch mechanism is disengaged.

* * * * *